United States Patent [19]

Kudo et al.

[11] Patent Number: 4,787,724
[45] Date of Patent: Nov. 29, 1988

[54] TRIPLET TYPE OBJECTIVE WITH A DIAPHRAGM ARRANGED BEHIND THE LENS SYSTEM

[75] Inventors: Yoshinobu Kudo, Sakai; Akira Fukushima, Osaka; Kazuo Kimura, Sakai, all of Japan

[73] Assignee: Minolta Camera Kabushiki Kaisha, Osaka, Japan

[21] Appl. No.: 11,980

[22] Filed: Feb. 6, 1987

[30] Foreign Application Priority Data

Feb. 7, 1986 [JP] Japan .................................. 61-26610

[51] Int. Cl.⁴ .............................................. G02B 9/14
[52] U.S. Cl. .................................. 350/475; 350/449
[58] Field of Search ............... 350/475, 449, 474, 463, 350/432

[56] References Cited

U.S. PATENT DOCUMENTS

| | | | |
|---|---|---|---|
| 3,912,379 | 10/1975 | DeJager | 350/432 |
| 4,105,308 | 8/1978 | Owen, Jr. et al. | 350/432 |
| 4,542,960 | 9/1985 | Sato | 350/475 |

FOREIGN PATENT DOCUMENTS

| | | |
|---|---|---|
| 40-35341 | 12/1965 | Japan . |
| 48-5494 | 2/1973 | Japan . |
| 48-90521 | 11/1973 | Japan . |
| 50-2807 | 1/1975 | Japan . |
| 57-2012 | 1/1982 | Japan . |
| 59-34510 | 2/1984 | Japan . |
| 59-160120 | 9/1984 | Japan . |
| 60-64317 | 4/1985 | Japan . |
| 60-162217 | 8/1985 | Japan . |
| 60-177313 | 9/1985 | Japan . |
| 60-107612 | 6/1986 | Japan . |

*Primary Examiner*—John K. Corbin
*Assistant Examiner*—Ronald M. Kachmarik
*Attorney, Agent, or Firm*—Price, Gess & Ubell

[57] ABSTRACT

In a triplet type objective for a compact lens shutter camera with a diaphragm arranged behind the lens system, the first lens element is formed of glass and the second and third lens elements are formed of plastic, so that it is advantageous in manufacturing cost and weight. Furthermore, sufficient marginal light rays and flatness of the image field can be obtained.

9 Claims, 8 Drawing Sheets

Spherical Aberration Sine Condition

FIG.8B

Astigmatism

FIG.8C

Distortion %

FIG.9A

Spherical Aberration Sine Condition

FIG.9B

Astigmatism

FIG.9C

Distortion %

FIG.10A

Spherical Aberration / Sine Condition

FIG.10B

Astigmatism

FIG.10C

Distortion

FIG.11A

Spherical Aberration / Sine Condition

FIG.11B

Astigmatism

FIG.11C

Distortion

TRIPLET TYPE OBJECTIVE WITH A DIAPHRAGM ARRANGED BEHIND THE LENS SYSTEM

BACKGROUND OF THE INVENTION

1. Field of the Invention

The present invention relates to an objective for compact lens-shutter cameras whose diaphragm is arranged behind the whole optical system, and more particularly to a compact wide angle objective with a simple construction for cameras for a spread use.

2. Description of the Prior Art

With a compact lens-shutter camera for cameras for a spread use, a wide angle objective with a diaphragm arranged behind the whole lens system is advantageous for accommodation in the camera, for compactization of the camera or the objective itself and for realization of precise focusing. As this kind of objective, triplet type objectives with $F_{No.}$ of 4–2.8 and a total angular field coverage of 60°–64° have been proposed. With a wide angle triplet type objective, since an astigmatic difference tends to become large at a marginal angular field, it was conventional to construct this type of objective by the use of lens elements formed of a glass with a high refractive index. For example, in Japanese patent application laid-open No. Sho. 59-34510, all lens elements, one or two of which have an aspherical surface, are formed of glass with a high refractive index to construct an objective with a total angular field coverage of 64°, and $F_{No.}$ of 3.5. In Japanese patent application laid-open No. Sho. 57-2012, an objective with $F_{No.}$ of 4 and a total angular field of 64° has been realized with the use of a glass with a high refractive index. But forming a lens element of glass of a high refractive index incurs an increase in the manufacturing cost.

Besides, with a triplet type objective with a diaphragm arranged behind the whole lens system, a problem exists in that the amount of marginal light rays tends to become insufficient and this promblem has not been solved.

SUMMARY OF THE INVENTION

An object of the present invention is to provide a triplet type wide angle objective with a compact size and light weight, which can secure a sufficient amount of marginal light rays, whose manufacturing cost is low, whose construction is advantageous in manufacturing of lens elements and whose aberrations are corrected well.

Figure 1:
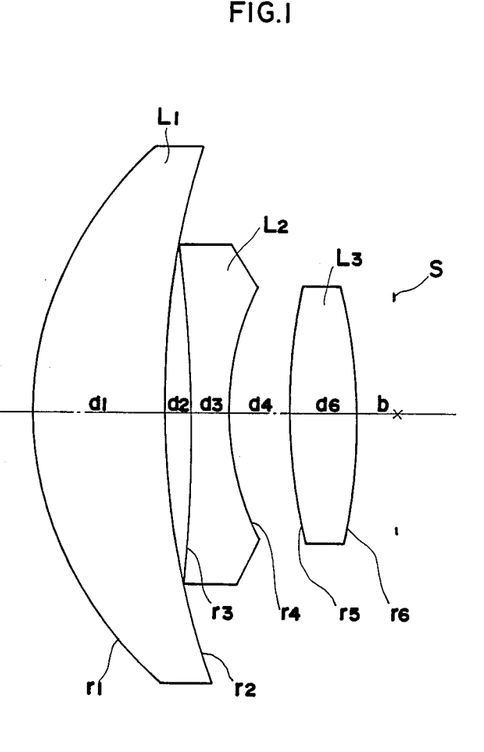
FIG. 1 is a cross sectional view of an objective according to the respective embodiments of the present invention.
Figure 2A:
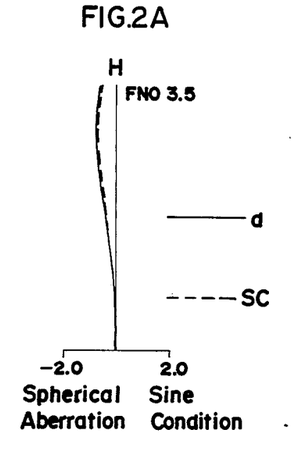
FIGS. 2A to 2C represent the aberration curves of the embodiment 1 respectively.
Figure 2B:
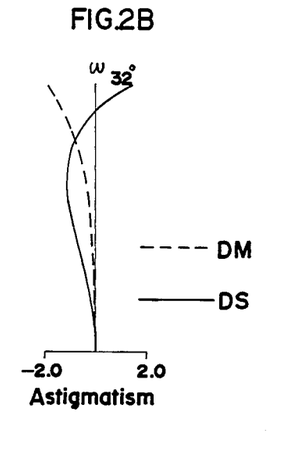
Figure 2C:
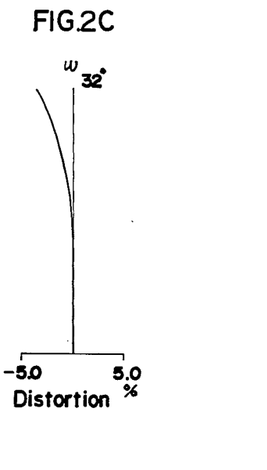
Figure 3A:
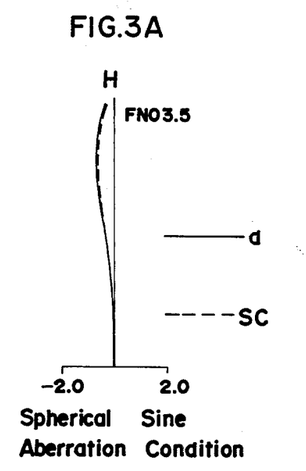
FIGS. 3A to 3C represent the aberration curves of the embodiment 2 respectively.
Figure 3B:
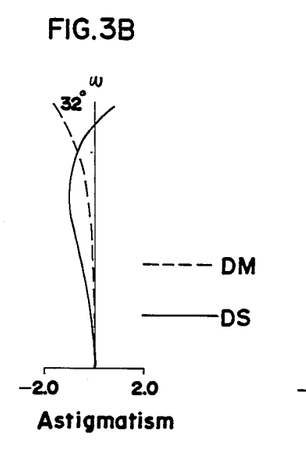
Figure 3C:
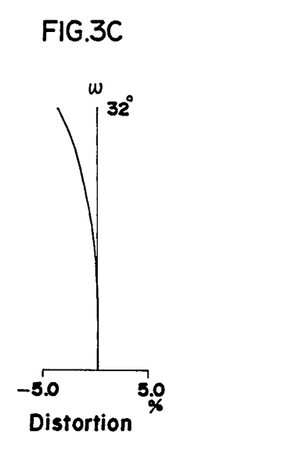
Figure 4A:
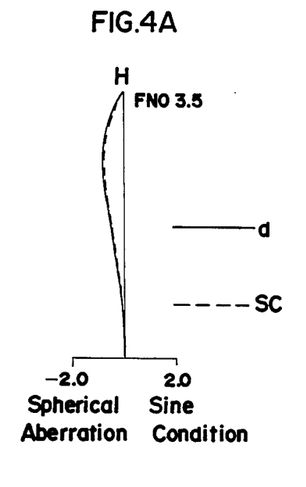
FIGS. 4A to 4C represent the aberration curves of the embodiment 3 respectively.
Figure 4B:
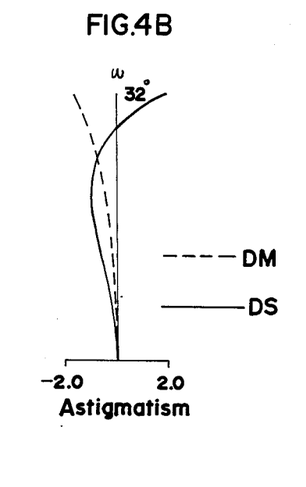
Figure 4C:
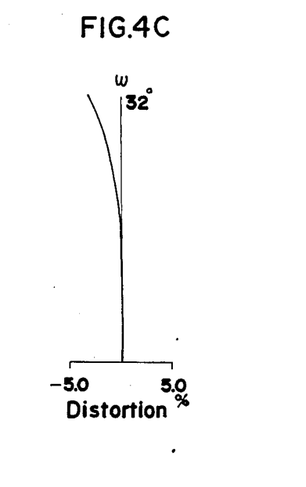
Figure 5A:
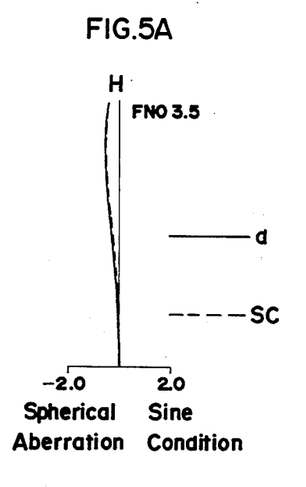
FIGS. 5A to 5C represent the aberration curves of the embodiment 4 respectively.
Figures 5B, 5C:
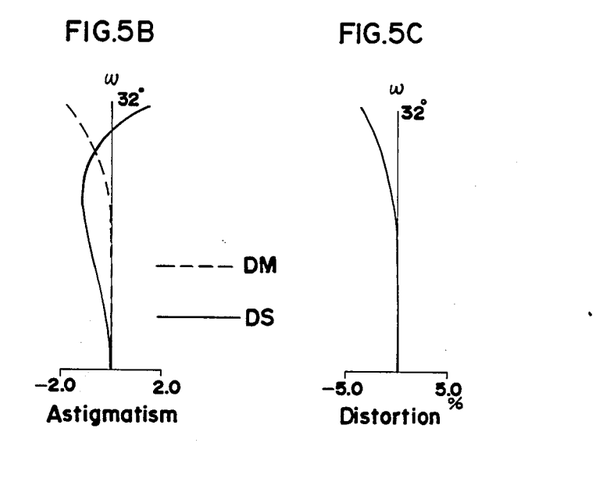
Figure 6A:
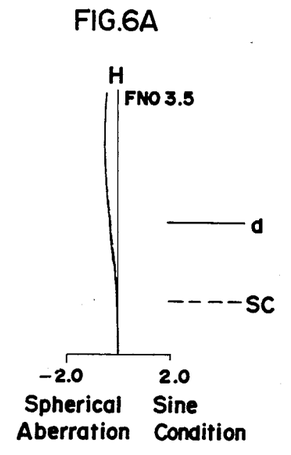
FIGS. 6A to 6C represent the aberration curves of the embodiment 5 respectively.
Figure 6B:
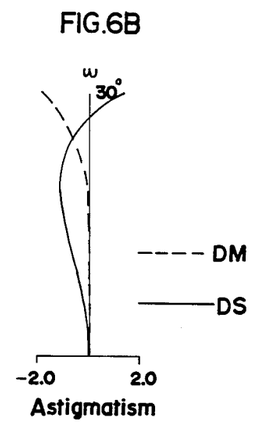
Figure 6C:
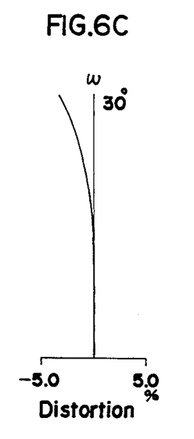
Figure 7A:
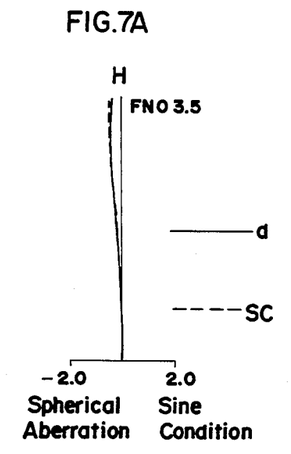
FIGS. 7A to 7C represent the aberration curves of the embodiment 6 respectively.
Figure 7B:
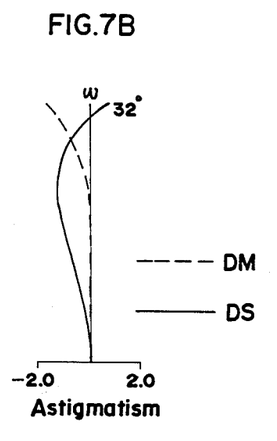
Figure 7C:
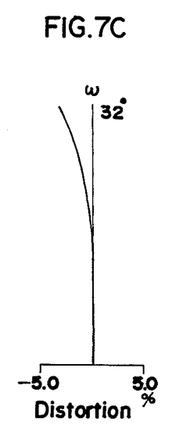
Figure 8A:
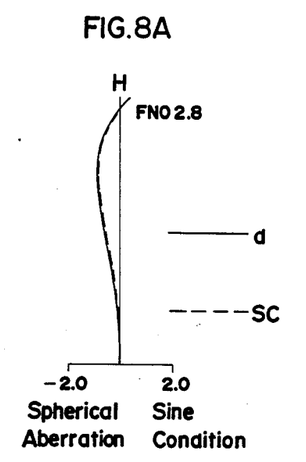
FIGS. 8A to 8C represent the aberration curves of the embodiment 7 respectively.
Figure 8B:
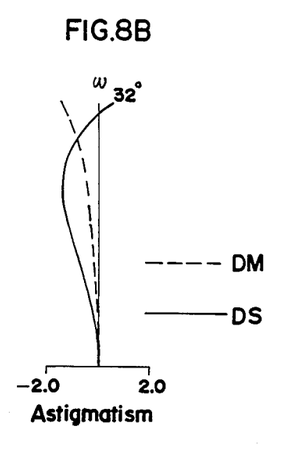
Figure 8C:
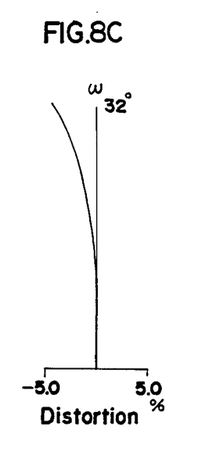
Figure 9A:
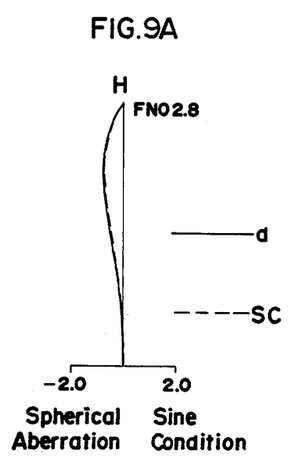
FIGS. 9A to 9C represent the aberration curves of the embodiment 8 respectively.
Figure 9B:
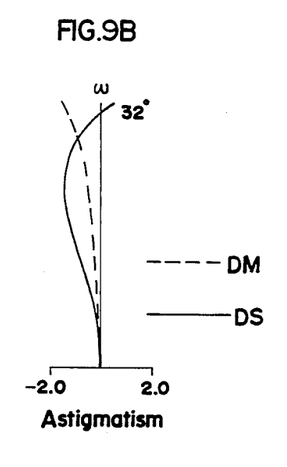
Figure 9C:
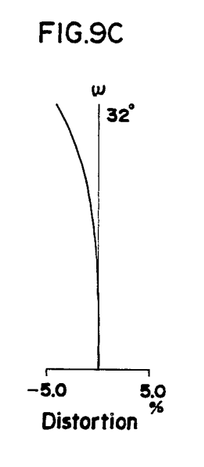
Figure 10A:
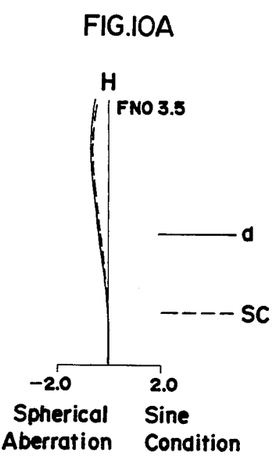
FIGS. 10A to 10C represent the aberration curves of the embodiment 9 respectively.
Figure 10B:
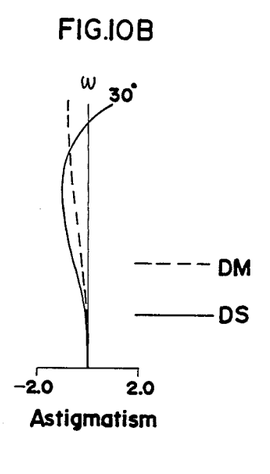
Figure 10C:
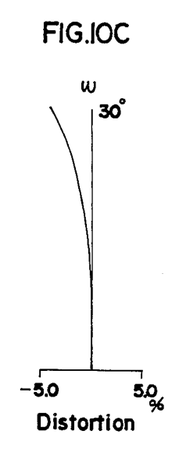
Figure 11A:
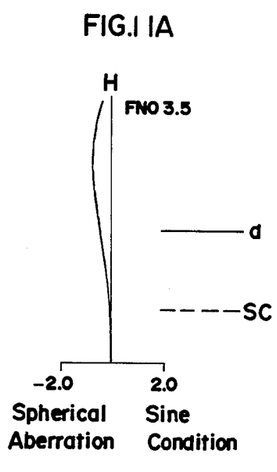
FIGS. 11A to 11C represent the aberration curves of the embodiment 10 respectively.
Figure 11B:
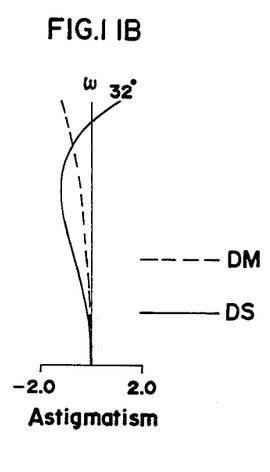
Figure 11C:
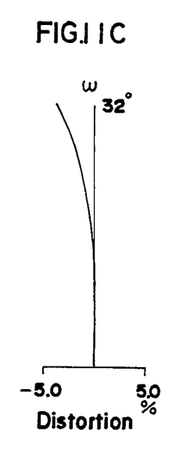
Figure 12A:
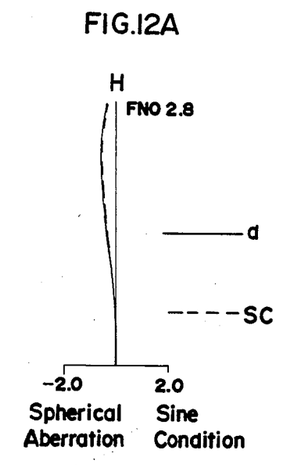
FIGS. 12A to 12C represent the aberration curves of the embodiment 11 respectively.
Figure 12B:
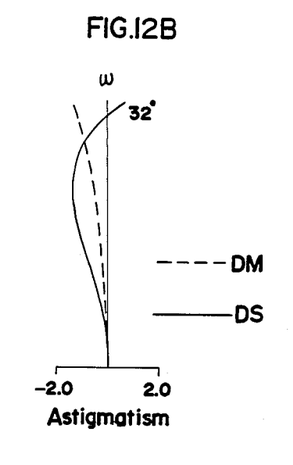
Figure 12C:
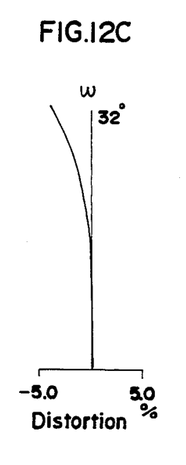
Figure 13A:
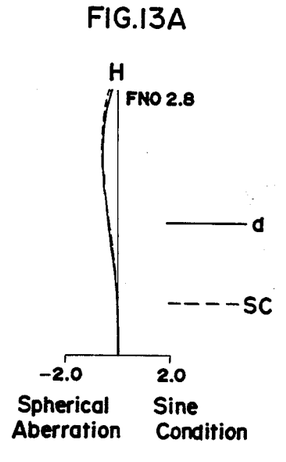
FIGS. 13A to 13C represent the aberration curves of the embodiment 12 respectively.
Figure 13B:
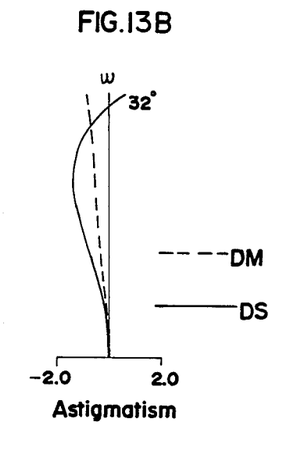
Figure 13C:
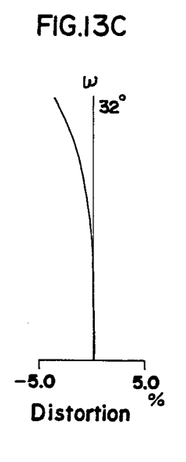
Figure 14A:
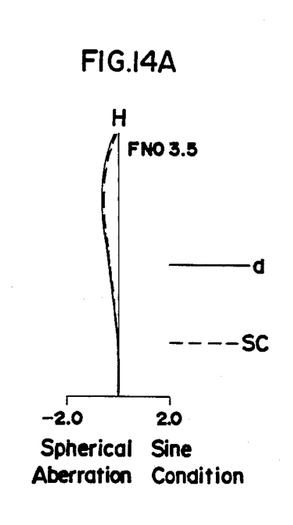
FIGS. 14A to 14C represent the aberration curves of the embodiment 13 respectively.
Figure 14B:
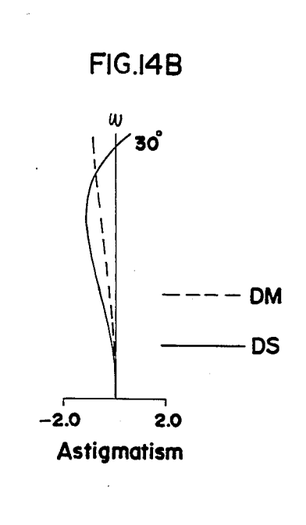
Figure 14C:
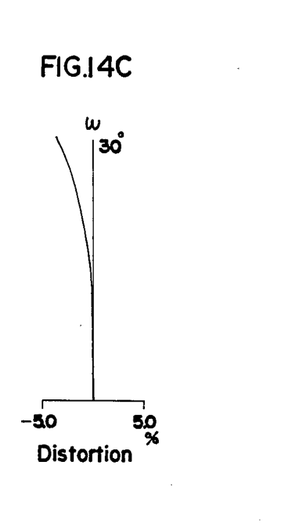
Figure 15A:
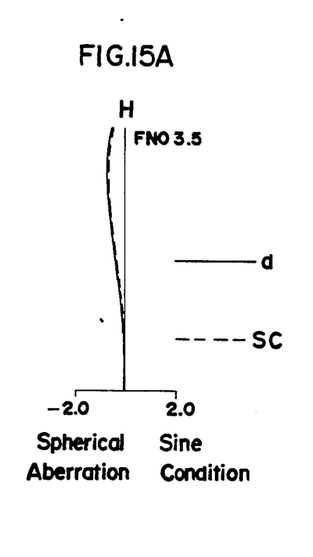
FIGS. 15A to 15C represent the aberration curves of the embodiment 14 respectively.
Figure 15B:
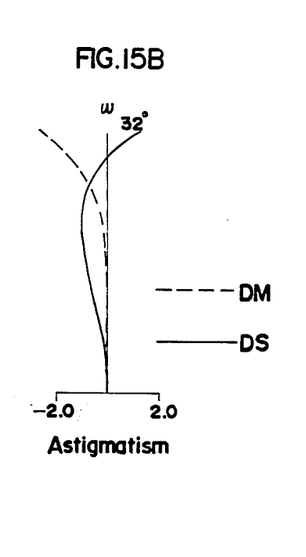
Figure 15C:
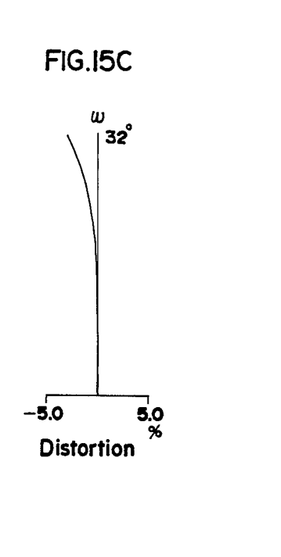

To achieve these objects a triplet type objective according to the present invention, as shown in FIG. 1, comprises a lens system and a diaphragm (S) arranged behind the lens system. The lens system consists of, from the object side, a first positive meniscus lens element ($L_1$) having a positive refractive power on the object side surface, a second biconcave lens element ($L_2$) and a third biconvex lens element ($L_3$). The first lens element ($L_1$) is formed of glass and the second ($L_2$) and third lens ($L_3$) elements are formed of plastic. Further, the lens systems fulfills the following conditions:

$$0.25f < \Sigma d + b < 0.45f \quad (1)$$

$$0.15 < N_1 - N_3 < 0.4 \quad (2)$$

wherein, f represents the focal length of the lens system;

$\Sigma d$ represents the axial distance from the first surface ($r_1$) to the last surface ($r_6$) of the lens system, b represents the axial distance from the last surface ($r_6$) of the lens system to the diaphragm (S), $N_1$ represents the refractive index of the first lens element ($L_1$), and $N_3$ represents the refractive index of the third lens element ($L_3$).

Condition (1) is to increase the amount of marginal light rays which, otherwise would tend to be insufficient with a wide angle triplet type objective having a diaphragm arranged behind the whole lens system. If the upper limit of the condition (1) is violated, it becomes difficult to secure a sufficient amount of marginal light rays and the objective becomes bulky in size. On the other hand, if the lower limit of condition (1) is violated, the curvature of the field deteriorates, and further, the thickness of the peripheral portion of the positive lens elements decreases so much that manufacturing of the lens elements becomes difficult.

According to the present invention, the second negative lens element ($L_2$) and the third positive lens element ($L_3$) are made of plastic, so that the change of back focus caused by a change of the temperature is cancelled, and both the weight of the objective and the cost for manufacturing of the lens elements can decrease. Although the third plastic lens element ($L_3$) has a week refractive index, the first lens element ($L_1$) made of glass with a stronger refractive index prevents the petzval sum from becoming great, so that the astigmatic difference is corrected well. Thus, the present invention is characterized in that the refractive index of the first lens element ($L_1$) is much greater than that of the third lens element ($L_3$) as represented by the condition (2). When the condition (2) is satisfied, an image field of the objective can be ketp substatially flat over an angular field of 65°. If the lower limit of the condition (2) is violated, the petzval sum cannot be made small and the astigmatic difference at a large angular field becomes great. On the other hand, the upper limit of the condition (2) shows the highest limit of the refractive index of the glass which is normally available as the first lens element ($L_1$).

Furthermore, according to the present invention, it is desirable to fulfill the following conditions:

$$1.1/f < \phi_1 < 1.9/f \quad (3)$$

$$-0.75/f < \phi_{23} < 0.02/f \quad (4)$$

$$0.8f < -r_3 < 3.0f \quad (5)$$

$$0.38f < r_5 < 0.76f \quad (6)$$

$$0.35f < -r_6 < 0.64f \quad (7)$$

wherein, $\phi_1$ represents the refractive power of the first lens element ($L_1$), $\phi_{23}$ represents the composite refractive power of the second and the third lens elements ($L_2$) and ($L_3$), $r_3$ represents the radius of curvature of the object side surface of the second lens element ($L_2$), $r_5$ represents the radius of curvature of the object side surface of the third lens element ($L_3$) and $r_6$ represents the radius of curvature of the image side surface of the third lens element ($L_3$).

Condition (3) is desirable for compactization of the objective and for security for the marginal light rays. When the condition (3) is satisfied, the objective can be constructed compactly and the marginal light rays required for providing an object image being bright even at marginal portions can be secured. If the lower limit of condition (3) is violated, marginal light rays are cut off, so that vignetting at a large angular portion of the field increases. In contrast thereto, if the upper limit of the condition (3) is violated, the petzval sum increases so much that it becomes difficult to correct the curvature of field and the positive distortion is caused remarkably, while the marginal light rays can be secured to more of a extent and the objective can be constructed more compactly.

Condition (4) is desirable for decreasing the change of the back focus depending on the change of temperature which is caused by use of plastic lenses. As the composite refractive power of the second and the third lens elements ($L_2$) and ($L_3$) becomes small, the change of the back focus can be well cancelled. But, if the composite refractive power ($\phi_{23}$) becomes small beyond the lower limit of condition (4), the refractive power of the first lens element should be so great that the curvature of field cannot be corrected well. On the contrary, if the upper limit of condition (4) is violated, the change of back focus depending on the change of temperature becomes great, so that a means for mechanically changing the back focus should be accommodated in a lens barrel.

Conditions (5), (6) and (7) are for correcting spherical aberration, curvature of field and the coma well. The radius of curvature ($r_3$) of the object side surface of the second lens element ($L_2$) is effective for correcting the coma caused by the lower marginal ray in the intermediate and marginal area, whereas the radius of curvature ($r_6$) of the image side surface of the third lens element ($L_3$) is effective for correcting the coma caused by the upper marginal ray.

If the upper limit of condition (5) is violated, spherical aberration and curvature of field undergo over-correction. On the contrary, if the lower limit of condition (5) is violated, spherical aberration is in an undercorrection state and the coma towards the outward direction is produced at the intermediate area of the picture format.

If the upper limit of condition (6) is violated, spherical aberration and curvature of field are in an over-correction state and if the lower limit of condition (6) is violated, spherical aberration and curvature of field are in an undercorrection.

If the upper limit of condition (7) is violated, spherical aberration is in overcorrection state and the coma towards the inward direction is produced in the marginal area. In contrast thereto the lower limit of condition (7) is violated, spherical aberration and curvature of field are not corrected well.

For still better correction of aberrations, it is desirable that conditions (5), (6) and (7) have the following range:

$$0.9f < -r_3 < 1.3f \tag{5'}$$

$$0.38f < r_5 < 0.65f \tag{6'}$$

$$0.35f < -r_6 < 0.62f \tag{7'}$$

When a plastic lens element is used, it becomes easier to employ an aspherical surface. According to this invention it is desirable to employ an aspherical surface for one of the surfaces of the second and third lens elements ($L_2$) and ($L_3$), so that spherical aberration, distortion, curvature of field and coma which are not so satisfactory corrected in case of an objective consisting of only spherical lens elements can be corrected almost completely. Furthermore, it is better to employ one more aspherical surface for another surface of the second and third lens elements ($L_2$) ($L_3$) in order to correct aberrations in high degrees.

Another triplet type objective of the present invention comprises a lens system and a diaphragm (S) arranged behind the lens system. The lens system consists of, from the object side, a first positive meniscus lens element ($L_1$) having a positive refractive power on the object side surface, a second biconcave lens element ($L_2$) and a third biconvex lens element ($L_3$). The first lens element ($L_1$) is formed of glass and the second and third lens elements ($L_2$, $L_3$) are formed of plastic. Further, the lens system fulfills following conditions:

$$0.15 < N_1 - N_3 < 0.4 \tag{8}$$

$$1.4 < N_2 < 1.65 \tag{9}$$

$$1.4 < N_3 < 1.65 \tag{10}$$

wherein $N_2$ represents the refractive index of the second lens element.

Condition (8) is the same as condition (2) and has the same meaning.

The upper limit of conditions (9) and (10) is set in consideration of the refractive index of plastics which are normally available for a lens. If the lower limit of condition (9) is violated, the curvature of field is in an overcorrection state and the coma to the inward direction becomes difficult to be corrected. On the other hand, if the lower limit of condition (10) is violated, the spherical aberration is in an undercorrection state.

The features of the present invention which are believed to be novel are set forth with particularity in the appended claimed. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured triplet type objective. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a compact lens shutter camera.

In the drawings, FIG. 1 shows the position of the lens elements. Values of radii of curvature and axial distances for each lens element and air spaces in the respective embodiments are provided in the accompanying tables set forth herein, and the schematic cross sectional view of FIG. 1 follows the normal conventions of an object at the left-hand side of the drawing and the image plane at the right-hand side. The lens system of all embodiments fulfill the following conditions:

$$1.7 < N_1 < 1.9, \quad 35 < \nu_1 < 50 \tag{11}$$

$$1.4 < N_2 < 1.65, \quad 27 < \nu_2 < 50 \tag{12}$$

$$1.4 < N_3 < 1.65, \quad 35 < \nu_3 < 65 \tag{13}$$

wherein, $N_2$ represents the refractive index of the second lens element ($L_2$), $\nu_1$ represents abbe number of the first lens element ($L_1$), $\nu_2$ represents abbe number of the second lens element ($L_2$) and $\nu_3$ represents abbe number of the third lens element.

The following tables 1 to 14 disclose, respectively design parameters of embodiments 1 to 14 of the present invention. In the embodiments $L_1$, $L_2$, $L_3$ are the lens elements from the object side, $r_1$, $r_2$, $r_3$... is respectively the radius of curvature from the object side, and the $d_1$, $d_2$, $d_3$... is respectively the axial thickness including both air spaces and the actual thickness of a lens element. $Nd_1$, $Nd_2$, $Nd_3$ is respectively the refractive index of the first through third lens element and $\nu d_1$, $\nu d_2$, $\nu d_3$ is respectively the abbe number of the first ($L_1$) through third lens element ($L_3$). A surface with the mark * represents an aspherical surface, whose configuration is defined as follows:

$$X = \frac{Y^2}{ri + ri\sqrt{1 - \left(\frac{Y}{ri}\right)^2}} +$$

-continued
$$AY^2 + BY^4 + CY^6 + DY^8 + EY^{10} + FY^{12} + \ldots$$

wherein, X represents the coordinate along the optical axis measured from an imaginary plane tangent to the aspherical surface perpendicularly to the optical axis, Y represents the coordinate perpendicular to the optical axis from the optical axis, ri represents a paraxial radius of curvature, and A, B, C, D, . . . is aspherical coefficient.

TABLE 1

[Embodiment 1]

$f = 100 \quad 2\omega = 64° \quad F_{No.} \ 3.5$

| radius of curvature | | axial distance | refractive index | | Abbe number | |
|---|---|---|---|---|---|---|
| $r_1$ | 32.638 | | | | | |
| | | $d_1$ 12.57 | $Nd_1$ | 1.78850 | $\nu d_1$ | 45.68 |
| $r_2$ | 75.166 | | | | | |
| | | $d_2$ 2.71 | | | | |
| $r_3$ | −126.741 | | | | | |
| | | $d_3$ 3.71 | $Nd_2$ | 1.58400 | $\nu d_2$ | 31.0 |
| $r_4$ | 27.191 | | | | | |
| | | $d_4$ 6.00 | | | | |
| $r_5$ | 54.404 | | | | | |
| | | $d_5$ 6.57 | $Nd_3$ | 1.49140 | $\nu d_3$ | 57.8 |
| $r_6$ | −51.527 | | | | | |
| | | b 3.71 | | | | |
| $r_7$ | ∞ | | | | | |

$\Sigma d + b = 0.35f$
$\phi_1 = 1.55/f$
$\phi_{23\ 23}\ -0.40/f$
$N_1 - N_3 = 0.297$

TABLE 2

[Embodiment 2]

$f = 100 \quad 2\omega = 60° \quad F_{No.} \ 3.5$

| radius of curvature | | axial distance | refractive index | | Abbe number | |
|---|---|---|---|---|---|---|
| $r_1$ | 32.888 | | | | | |
| | | $d_1$ 13.36 | $Nd_1$ | 1.78100 | $\nu d_1$ | 44.55 |
| $r_2$ | 76.148 | | | | | |
| | | $d_2$ 1.97 | | | | |
| $r_3$ | −108.471 | | | | | |
| | | $d_3$ 3.42 | $Nd_2$ | 1.58400 | $\nu d_2$ | 31.0 |
| $r_4$ | 27.718 | | | | | |
| | | $d_4$ 6.70 | | | | |
| $r_5$ | 57.053 | | | | | |
| | | $d_5$ 5.53 | $Nd_3$ | 1.49140 | $\nu d_3$ | 57.8 |
| $r_6$ | −47.602 | | | | | |
| | | b 5.26 | | | | |
| $r_7$ | ∞ | | | | | |

$\Sigma d + b = 0.36f$
$\phi_1 = 1.53/f$
$\phi_{23} = -0.35/f$
$N_1 - N_3 = 0.290$

TABLE 3

[Embodiment 3]

$f = 100 \quad 2\omega = 64° \quad F_{No.} \ 3.5$

| radius of curvature | | axial distance | refractive index | | Abbe number | |
|---|---|---|---|---|---|---|
| $r_1$ | 30.47 | | | | | |
| | | $d_1$ 11.14 | $Nd_1$ | 1.77250 | $\nu d_1$ | 49.77 |
| $r_2$ | 72.753 | | | | | |
| | | $d_2$ 2.57 | | | | |
| $r_3*$ | −97.730 | | | | | |
| | | $d_3$ 3.14 | $Nd_2$ | 1.56790 | $\nu d_2$ | 34.6 |
| $r_4$ | 25.066 | | | | | |
| | | $d_4$ 5.43 | | | | |
| $r_5$ | 49.947 | | | | | |
| | | $d_5$ 6.00 | $Nd_3$ | 1.49140 | $\nu d_3$ | 57.8 |
| $r_6$ | −50.009 | | | | | |

TABLE 3-continued

[Embodiment 3]

| | | b | 3.71 | | |
|---|---|---|---|---|---|
| $r_7$ | ∞ | | | | |

$A = 0.0$     $\Sigma d + b = 0.32f$
$B = 0.15540 \times 10^{-5}$     $\phi_1 = 1.64/f$
$C = -0.22578 \times 10^{-8}$     $\phi_{23} = 0.51/f$
$D = 0.38316 \times 10^{-11}$     $N_1 - N_3 = 0.281$
$E = 0.59368 \times 10^{-16}$

TABLE 4

[Embodiment 4]

$f = 100$  $2\omega = 64°$  $F_{No.}\ 3.5$

| radius of curvature | axial distance | refractive index | Abbe number |
|---|---|---|---|
| $r_1$  34.747 | | | |
| | $d_1$  14.12 | $Nd_1$  1.8050 | $\nu d_1$  40.97 |
| $r_2$  67.767 | | | |
| | $d_2$  3.53 | | |
| $r_3$  −104.876 | | | |
| | $d_3$  3.71 | $Nd_2$  1.59160 | $\nu d_2$  30.9 |
| $r_4$  30.319 | | | |
| | $d_4$  5.26 | | |
| $r_5$  48.657 | | | |
| | $d_5$  6.78 | $Nd_3$  1.49140 | $\nu d_3$  57.8 |
| $r_6*$  −49.214 | | | |
| | b  3.71 | | |
| $r_7$  ∞ | | | |

$A = 0.0$     $\Sigma d + b = 0.37f$
$B = 0.13795 \times 10^{-5}$     $\phi_1 = 1.34/f$
$C = 0.42654 \times 10^{-9}$     $\phi_{23} = -0.18/f$
$D = 0.66053 \times 10^{-15}$     $N_1 - N_3 = 0.314$
$E = 0.58736 \times 10^{-20}$
$F = 0.26860 \times 10^{-25}$

TABLE 5

[Embodiment 5]

$f = 100$  $2\omega = 64°$  $F_{No.}\ 3.5$

| radius of curvature | axial distance | refractive index | Abbe number |
|---|---|---|---|
| $r_1$  35.498 | | | |
| | $d_1$  15.37 | $Nd_1$  1.82050 | $\nu d_1$  43.00 |
| $r_2$  58.788 | | | |
| | $d_2$  3.14 | | |
| $r_3$  −98.477 | | | |
| | $d_3$  3.71 | $Nd_2$  1.59160 | $\nu d_2$  30.9 |
| $r_4$  31.727 | | | |
| | $d_4$  4.35 | | |
| $r_5$  46.432 | | | |
| | $d_5$  7.80 | $Nd_3$  1.49140 | $\nu d_3$  57.8 |
| $r_6$  −44.766 | | | |
| | b  3.71 | | |
| $r_7$  ∞ | | | |

$A = 0.0$     $\Sigma d + b = 0.38f$
$B = 0.83081 \times 10^{-6}$     $\phi_1 = 1.19/f$
$C = 0.13132 \times 10^{-7}$     $\phi_{23} = 0.004/f$
$D = 0.34506 \times 10^{-13}$     $N_1 - N_3 = 0.329$
$E = 0.84807 \times 10^{-19}$
$F = 0.20775 \times 10^{-24}$

TABLE 6

[Embodiment 6]

$f = 100$  $2\omega = 64°$  $F_{No.}\ 3.5$

| radius of curvature | axial distance | refractive index | Abbe number |
|---|---|---|---|
| $r_1$  34.668 | | | |
| | $d_1$  15.06 | $Nd_1$  1.78850 | $\nu d_1$  45.68 |
| $r_2$  58.279 | | | |
| | $d_2$  3.00 | | |
| $r_3$  −90.762 | | | |
| | $d_3$  3.71 | $Nd_2$  1.58400 | $\nu d_2$  31.0 |

TABLE 6-continued

[Embodiment 6]

| | | | | | |
|---|---|---|---|---|---|
| $r_4$  31.607 | | | | | |
| | $d_4$  4.30 | | | | |
| $r_5$  42.876 | | | | | |
| | $d_5$  7.59 | $Nd_3$  1.49140 | $\nu d_3$  57.8 | | |
| $r_6*$  −47.054 | | | | | |
| | b  3.71 | | | | |
| $r_7$  ∞ | | | | | |

$A = 0.0$     $\Sigma d + b = 0.37f$
$B = 0.28310 \times 10^{-5}$     $\phi_1 = 1.18/f$
$C = -0.11696 \times 10^{-8}$     $\phi_{23} = 0.007/f$
$D = -0.10162 \times 10^{-13}$     $N_1 - N_3 = 0.297$
$E = -0.18068 \times 10^{-19}$
$F = -0.11907 \times 10^{-25}$

TABLE 7

[Embodiment 7]

$f = 100$  $2\omega = 64°$  $F_{No.}\ 2.8$

| radius of curvature | axial distance | refractive index | Abbe number |
|---|---|---|---|
| $r_1$  32.444 | | | |
| | $d_1$  10.52 | $Nd_1$  1.78850 | $\nu d_1$  45.68 |
| $r_2$  86.049 | | | |
| | $d_2$  2.57 | | |
| $r_3$  −152.892 | | | |
| | $d_3$  3.42 | $Nd_2$  1.58400 | $\nu d_2$  31.0 |
| $r_4$  27.815 | | | |
| | $d_4$  7.16 | | |
| $r_5*$  66.730 | | | |
| | $d_5$  7.14 | $Nd_3$  1.49140 | $\nu d_3$  57.8 |
| $r_6$  −54.200 | | | |
| | b  4.29 | | |
| $r_7$  ∞ | | | |

$A = 0.0$     $\Sigma d + b = 0.35f$
$B = -0.55372 \times 10^{-7}$     $\phi_1 = 1.64/f$
$C = 0.79659 \times 10^{-9}$     $\phi_{23} = -0.48/f$
$D = 0.29407 \times 10^{-13}$     $N_1 - N_3 = 0.297$
$E = 0.18795 \times 10^{-17}$
$F = 0.98693 \times 10^{-20}$

TABLE 8

[Embodiment 8]

$f = 100$  $2\omega = 64°$  $F_{No.}\ 2.8$

| radius of curvature | axial distance | refractive index | Abbe number |
|---|---|---|---|
| $r_1$  32.968 | | | |
| | $d_1$  11.09 | $Nd_1$  1.78850 | $\nu d_1$  45.68 |
| $r_2$  89.664 | | | |
| | $d_2$  2.57 | | |
| $r_3$  −168.474 | | | |
| | $d_3$  3.42 | $Nd_2$  1.58400 | $\nu d_2$  31.0 |
| $r_4*$  28.269 | | | |
| | $d_4$  7.62 | | |
| $r_5$  69.240 | | | |
| | $d_5$  7.14 | $Nd_3$  1.49140 | $\nu d_3$  57.8 |
| $r_6$  −56.455 | | | |
| | b  4.29 | | |
| $r_7$  ∞ | | | |

$A = 0.0$     $\Sigma d + b = 0.36f$
$B = 0.49278 \times 10^{-6}$     $\phi_1 = 1.64/f$
$C = -0.70317 \times 10^{-9}$     $\phi_{23} = -0.48/f$
$D = -0.47634 \times 10^{-14}$     $N_1 - N_3 = 0.297f$
$E = -0.23096 \times 10^{-17}$
$F = -0.96018 \times 10^{-21}$

TABLE 9

[Embodiment 9]

$f = 100$  $2\omega = 60°$  $F_{No.}\ 3.5$

| radius of curvature | axial distance | refractive index | Abbe number |
|---|---|---|---|

TABLE 9-continued

[Embodiment 9]

| | | | | | | | |
|---|---|---|---|---|---|---|---|
| $r_1$ | 31.599 | | | | | | |
| | | $d_1$ | 10.19 | $Nd_1$ | 1.78850 | $\nu d_1$ | 45.68 |
| $r_2$ | 96.621 | | | | | | |
| | | $d_2$ | 2.76 | | | | |
| $r_3*$ | −121.117 | | | | | | |
| | | $d_3$ | 3.15 | $Nd_2$ | 1.58400 | $\nu d_2$ | 31.0 |
| $r_4$ | 25.934 | | | | | | |
| | | $d_4$ | 8.36 | | | | |
| $r_5$ | 64.650 | | | | | | |
| | | $d_5$ | 5.01 | $Nd_3$ | 1.49140 | $\nu d_3$ | 57.8 |
| $r_6$ | −53.464 | | | | | | |
| | | $b$ | 5.26 | | | | |
| $r_7$ | ∞ | | | | | | |

$A = 0.0$  
$B = 0.90180 \times 10^{-6}$  
$C = 0.67468 \times 10^{-11}$  
$D = 0.22279 \times 10^{-12}$  
$E = 0.13483 \times 10^{-13}$  
$F = -0.52105 \times 10^{-16}$ $\Sigma d + b = 0.35f$  
$\phi_1 = 1.80/f$  
$\phi_{23} = -0.62/f$  
$N_1 - N_3 = 0.297$

TABLE 10

[Embodiment 10]

$f = 100 \quad 2\omega = 64° \quad F_{No.} 3.5$

| radius of curvature | | axial distance | | refractive index | | Abbe number | |
|---|---|---|---|---|---|---|---|
| $r_1$ | 30.452 | | | | | | |
| | | $d_1$ | 9.43 | $Nd_1$ | 1.78100 | $\nu d_1$ | 44.55 |
| $r_2$ | 85.753 | | | | | | |
| | | $d_2$ | 2.57 | | | | |
| $r_3$ | −153.986 | | | | | | |
| | | $d_3$ | 3.42 | $Nd_2$ | 1.58400 | $\nu d_2$ | 31.0 |
| $r_4*$ | 25.326 | | | | | | |
| | | $d_4$ | 7.14 | | | | |
| $r_5*$ | 66.485 | | | | | | |
| | | $d_5$ | 5.44 | $Nd_3$ | 1.49140 | $\nu d_3$ | 57.8 |
| $r_6$ | −52.762 | | | | | | |
| | | $b$ | 4.29 | | | | |
| $r_7$ | ∞ | | | | | | |

$A = 0.0$  
$B = 0.10283 \times 10^{-5}$  
$C = 0.83570 \times 10^{-11}$  
$D = 0.26781 \times 10^{-16}$  
$E = 0.37346 \times 10^{-20}$  
$F = 0.81422 \times 10^{-25}$ $A' = 0.0$  
$B' = 0.18452 \times 10^{-5}$  
$C' = 0.75265 \times 10^{-10}$  
$D' = 0.97872 \times 10^{-12}$  
$E' = 0.23635 \times 10^{-14}$  
$F' = -0.415123 \times 10^{-17}$ $\Sigma d + b = 0.32f$  
$\phi_1 = 1.78/f$  
$\phi_{23} = -0.64/f$  
$N_1 - N_3 = 0.290$

TABLE 11

[Embodiment 11]

$f = 100 \quad 2\omega = 64° \quad N_{No.} 2.8$

| radius of curvature | | axial distance | | refractive index | | Abbe number | |
|---|---|---|---|---|---|---|---|
| $r_1$ | 31.824 | | | | | | |
| | | $d_1$ | 10.00 | $Nd_1$ | 1.78850 | $\nu d_1$ | 45.68 |
| $r_2$ | 91.542 | | | | | | |
| | | $d_2$ | 2.57 | | | | |
| $r_3$ | −202.258 | | | | | | |
| | | $d_3$ | 3.42 | $Nd_2$ | 1.58400 | $\nu d_2$ | 31.0 |
| $r_4*$ | 26.758 | | | | | | |
| | | $d_4$ | 7.95 | | | | |
| $r_5$ | 73.592 | | | | | | |
| | | $d_5$ | 7.14 | $Nd_3$ | 1.49140 | $\nu d_3$ | 57.8 |
| $r_6*$ | −57.027 | | | | | | |
| | | $b$ | 4.29 | | | | |
| $r_7$ | ∞ | | | | | | |

$A = 0.0$  
$B = 0.10452 \times 10^{-5}$  
$C = -0.13199 \times 10^{-9}$  
$D = -0.29700 \times 10^{-14}$  
$E = -0.20207 \times 10^{-17}$ $A' = 0.0$  
$B' = -0.61739 \times 10^{-6}$  
$C' = -0.42239 \times 10^{-9}$  
$D' = -0.15244 \times 10^{-11}$  
$E' = -0.13200 \times 10^{-13}$ $\Sigma d + b = 0.35f$  
$\phi_1 = 1.74/f$  
$\phi_{23} = -0.57/f$  
$N_1 - N_3 = 0.297$

TABLE 11-continued

[Embodiment 11]

$F = -0.10080 \times 10^{-20} \quad F' = 0.10401 \times 10^{-16}$

TABLE 12

[Embodiment 12]

$f = 100 \quad 2\omega = 64° \quad F_{No.} 2.8$

| radius of curvature | | axial distance | | refractive index | | Abbe number | |
|---|---|---|---|---|---|---|---|
| $r_1$ | 32.150 | | | | | | |
| | | $d_1$ | 10.00 | $Nd_1$ | 1.78850 | $\nu d_1$ | 45.68 |
| $r_2$ | 99.546 | | | | | | |
| | | $d_2$ | 2.57 | | | | |
| $r_3*$ | −153.739 | | | | | | |
| | | $d_3$ | 3.42 | $Nd_2$ | 1.58400 | $\nu d_2$ | 31.0 |
| $r_4$ | 27.437 | | | | | | |
| | | $d_4$ | 7.95 | | | | |
| $r_5$ | 66.224 | | | | | | |
| | | $d_5$ | 7.14 | $Nd_3$ | 1.49140 | $\nu d_3$ | 57.8 |
| $r_6*$ | −62.351 | | | | | | |
| | | $b$ | 4.29 | | | | |
| $r_7$ | ∞ | | | | | | |

$A = 0.0$  
$B = 0.68768 \times 10^{-6}$  
$C = 0.23651 \times 10^{-9}$  
$D = -0.42567 \times 10^{-14}$  
$E = -0.68117 \times 10^{-17}$  
$F = -0.60955 \times 10^{-20}$ $A' = 0.0$  
$B' = 0.93209 \times 10^{-6}$  
$C' = -0.29337 \times 10^{-9}$  
$D' = -0.10900 \times 10^{-12}$  
$E' = -0.51595 \times 10^{-14}$  
$F' = 0.34096 \times 10^{-17}$ $\Sigma d + b = 0.35f$  
$\phi_1 = 1.77/f$  
$\phi_{23} = -0.61/f$  
$N_1 - N_3 = 0.297$

TABLE 13

[Embodiment 13]

$f = 100 \quad 2\omega = 60° \quad N_{No.} 3.5$

| radius of curvature | | axial distance | | refractive index | | Abbe number | |
|---|---|---|---|---|---|---|---|
| $r_1$ | 32.025 | | | | | | |
| | | $d_1$ | 10.19 | $Nd_1$ | 1.78850 | $\nu d_1$ | 45.68 |
| $r_2$ | 96.343 | | | | | | |
| | | $d_2$ | 2.76 | | | | |
| $r_3*$ | −125.127 | | | | | | |
| | | $d_3$ | 3.15 | $Nd_2$ | 1.58400 | $\nu d_2$ | 31.0 |
| $r_4$ | 27.024 | | | | | | |
| | | $d_4$ | 8.36 | | | | |
| $r_5*$ | 67.093 | | | | | | |
| | | $d_5$ | 5.01 | $Nd_3$ | 1.49140 | $\nu d_3$ | 57.8 |
| $r_6$ | −54.605 | | | | | | |
| | | $b$ | 5.26 | | | | |
| $r_7$ | ∞ | | | | | | |

$A = 0.0$  
$B = 0.82271 \times 10^{-6}$  
$C = 0.18044 \times 10^{-10}$  
$D = 0.74521 \times 10^{-16}$  
$E = 0.17643 \times 10^{-19}$  
$F = 0.11194 \times 10^{-23}$ $A' = 0.0$  
$B' = -0.44095 \times 10^{-6}$  
$C' = -0.29946 \times 10^{-11}$  
$D' = -0.84125 \times 10^{-14}$  
$E' = -0.20598 \times 10^{-14}$  
$F' = -0.16315 \times 10^{-15}$ $\Sigma d + b = 0.35f$  
$\phi_1 = 1.76/f$  
$\phi_{23} = -0.59/f$  
$N_1 - N_3 = 0.297$

TABLE 14

[Embodiment 14]

$f = 100 \quad 2\omega = 64° \quad F_{No.} 3.5$

| radius of curvature | | axial distance | | refractive index | | Abbe number | |
|---|---|---|---|---|---|---|---|
| $r_1$ | 31.254 | | | | | | |
| | | $d_1$ | 11.26 | $Nd_1$ | 1.78831 | $\nu d_1$ | 47.32 |

TABLE 14-continued

[Embodiment 14]

| | | | | | | |
|---|---|---|---|---|---|---|
| $r_2$ | 70.614 | | | | | |
| | | $d_2$ | 3.09 | | | |
| $r_3$ | −132.278 | | | | | |
| | | $d_3$ | 3.58 | $Nd_2$ 1.584 | $\nu d_2$ | 31.0 |
| $r_4$ | 26.374 | | | | | |
| | | $d_4$ | 5.73 | | | |
| $r_5$ | 52.869 | | | | | |
| | | $d_5$ | 6.16 | $Nd_3$ 1.4914 | $\nu d_3$ | 57.8 |
| $r_6$ | −52.869 | | | | | |
| | | b | 2.58 | | | |
| $r_7$ | ∞ | | | | | |
| S | 0 | | | | | |

$\Sigma d + b = 0.32f$
$\phi_1 = 1.58/f$
$\phi_{23} = -0.45/f$
$N_1 - N_3 = 0.297$

What is claimed is:

1. A triplet type objective lens system with a diaphragm arranged behind the lens system, comprising from the object side:
   a first positive meniscus lens element made of a glass material and having a positive refractive power on the object side surface;
   a second biconcave lens element made of a plastic material;
   a third biconvex lens element made of a plastic material, and
   a diaphragm, wherein the lens system fulfills the following conditions:

$0.25f < \Sigma d + b < 0.45f$ $0.18 < N_1 - N_3 < 0.4$ wherein:
   f represents a focal length of the whole lens system;
   $\Sigma d$ represents an axial distance from the object side surface of the first lens element to the image side surface of the third lens element;
   b represents an axial distance from the image side surface of the third lens element to the diaphragm;
   $N_1$ represents a refractive index of the first lens element, and
   $N_3$ represents a refractive index of the third lens element.

2. A triplet type objective lens system as claimed in claim 1, wherein the triplet type objective lens system fulfills the following conditions:

$0.8f < -r_3 < 3.0f$ $0.38f < r_5 < 0.76f$ $0.35f < -r_6 < 0.64f$ wherein
   $r_3$ represents the radius of curvature of the object side surface of the second lens element;
   $r_5$ represents the radius of carvature of the object side surface of the third lens element and
   $r_6$ represents the radius of curvature of the image side surface of the third lens element.

3. A triplet type objective lens system as claimed in claim 1, wherein one of the surfaces of the second and the third lens elements is an aspherical surface.

4. A triplet type objective lens system as claimed in claim 1, wherein two surfaces of the second and the third lens elements are aspherical surfaces.

5. A triplet type objective lens system as claimed in claim 1, wherein the lens system further fulfills the following conditions:

$1.1/f < \phi_1 < 1.9/f$ $-0.75/f < \phi_{23} < 0.02/f$ $0.9f < -r_3 < 1.3f$ $0.38f < r_5 < 0.65f$ $0.35f < -r_6 < 0.62f$ wherein:
   $\phi_1$ represents the refractive power of the first lens element;
   $\phi_{23}$ represents the compound refractive power of the second and third lens elements;
   $r_3$ represents the radius of curvature of the object side surface of the second lens element;
   $r_5$ represents the radius of curvature of the object side surface of the third lens element, and
   $r_6$ represents the radius of curvature of the image side surface of the third lens element.

6. A triplet type objective comprising,
   (a) a lens system which comprises from the object side;
   a first positive meniscus lens element having a positive refractive power on the object side surface,
   a second biconcave lens element,
   a third biconvex lens element,
   wherein, the first lens element is formed of glass and the second and third lens elements are formed of plastic, and
   (b) a diaphragm arranged behind the lens system,
   (c) wherein the lens system fulfills the following conditions:

$0.18 < N_1 - N_3 < 0.4$ $1.4 < N_2 < 1.65$ $1.4 < N_3 < 1.65$ wherein
   $N_1$ represents the refractive index of the first lens element;
   $N_2$ represents the refractive index of the second lens element; and
   $N_3$ represents the refractive index of the third lens element.

7. A triplet type objective as claimed in claim 6, wherein the triplet type objective fulfills the following condition:

$-0.75/f < \phi_{23} < 0.02/f$ wherein:
   $\phi_{23}$ represents the composite refractive power of the second and third lens elements; and
   f represents the focal length of the lens system.

8. A triplet type objective, wherein the triplet type objective having the following values.

| | f = 100 2ω = 64° F$_{No.}$ 3.5 | | | |
|---|---|---|---|---|
| radius of curvature | axial distance | | refractive index | Abbe number |
| r$_1$ 32.638 | | | | |
| | d$_1$ | 12.57 | Nd$_1$ 1.78850 | νd$_1$ 45.68 |
| r$_2$ 75.166 | | | | |
| | d$_2$ | 2.71 | | |
| r$_3$ −126.741 | | | | |
| | d$_3$ | 3.71 | Nd$_2$ 1.58400 | νd$_2$ 31.0 |
| r$_4$ 27.191 | | | | |
| | d$_4$ | 6.00 | | |
| r$_5$ 54.404 | | | | |
| | d$_5$ | 6.57 | Nd$_3$ 1.49140 | νd$_3$ 57.8 |
| r$_6$ −51.527 | | | | |
| | b | 3.71 | | |
| r$_7$ ∞ | | | | |

9. A triplet type objective lens system with a diaphragm arranged behind the lens system, comprising from the object side:
   a first positive meniscus lens element made of a glass material and having a positive refractive power on the object side surface;
   a second biconcave lens element made of a plastic material;
   a third biconvex lens element made of a plastic material, and
   a diaphragm, wherein the lens system fulfills the following conditions:

$$1.1/f < \phi_1 < 1.9/f$$

$$-0.75/f < \phi_{23} < 0.02/f$$

$$0.8f < -r_3 < 3.0f$$

$$0.38f < r_5 < 0.76f$$

$$0.35f < -r_6 < 0.64f$$

wherein:
   $\phi_1$ represents the refractive power of the first lens element;
   $\phi_{23}$ represents the compound refractive power of the second and third lens elements;
   r$_3$ represents the radius of curvature of the object side surface of the second lens element;
   r$_5$ represents the radius of curvature of the object side surface of the third lens element, and
   r$_6$ represents the radius of curvature of the image side surface of the third lens element.

* * * * *